United States Patent [19]

Tsuboyama et al.

[11] Patent Number: 4,846,560
[45] Date of Patent: Jul. 11, 1989

[54] LIQUID CRYSTAL DEVICE WITH FERROELECTRIC LIQUID CRYSTAL ORIENTED AT NON-PIXEL PORTIONS

[75] Inventors: Akira Tsuboyama; Hiroyuki Kitayama, both of Tokyo; Osamu Taniguchi, Kawasaki, all of Japan

[73] Assignee: Canon Kabushiki Kaisha, Tokyo, Japan

[21] Appl. No.: 904,051

[22] Filed: Sep. 4, 1986

[30] Foreign Application Priority Data

Sep. 13, 1985 [JP] Japan ................ 60-201723

[51] Int. Cl.$^4$ .............................................. G02F 1/13
[52] U.S. Cl. ................................ 350/350 S; 350/341; 350/336
[58] Field of Search ............... 350/332, 350 S, 341, 350/342, 343, 346, 333, 336, 331 R

[56] References Cited

U.S. PATENT DOCUMENTS

| 3,951,519 | 4/1976 | Schmidlin | 350/342 |
| 4,267,556 | 5/1981 | Fotland et al. | 346/153.1 |
| 4,367,924 | 1/1983 | Clark | 350/350 S |
| 4,586,791 | 5/1986 | Isogai et al. | 350/341 |
| 4,624,531 | 11/1986 | Wada et al. | 350/341 |
| 4,639,089 | 1/1987 | Okada et al. | 350/341 |
| 4,692,779 | 9/1987 | Ando et al. | 346/153.1 |
| 4,712,873 | 12/1987 | Kanbe et al. | 350/350 S |
| 4,712,878 | 12/1987 | Taniguchi et al. | 350/350 S |

FOREIGN PATENT DOCUMENTS

| 0091637 | 10/1983 | European Pat. Off. | 350/350 S |
| 0078023 | 5/1982 | Japan | 350/346 |
| 0079221 | 5/1984 | Japan | 350/346 |
| 2129606 | 5/1984 | United Kingdom . | |
| 2159635 | 12/1985 | United Kingdom | 350/346 |

OTHER PUBLICATIONS

K. Kondo–"A Practical Method–by Utilizing Spacer Edges", pp. L85–L87–Applied Journal of Applied Physics–vol. 22–No. 2–Feb. 1983.

Primary Examiner—Stanley D. Miller
Assistant Examiner—Iai V. Duong
Attorney, Agent, or Firm—Fitzpatrick, Cella, Harper & Scinto

[57] ABSTRACT

The specification and the drawing discloses a liquid crystal device for use as a liquid crystal display device, a liquid crystal-optical shutter, etc., having a matrix cell structure having scanning electrodes and signal electrodes intersecting with each other, each intersection forming a pixel. The orientation of the liquid crystal at portions other the pixels of the cell is controlled to provide a liquid crystal device with improved display or driving characteristic by removing picture unevenness and light leakage.

7 Claims, 4 Drawing Sheets

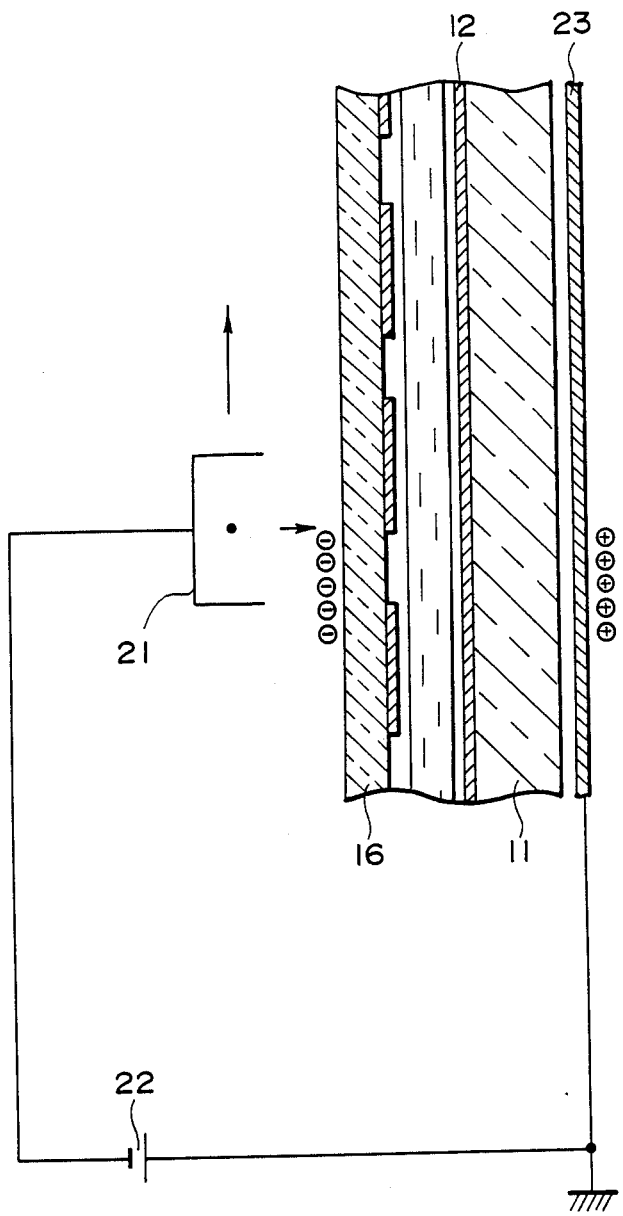
F I G. 1

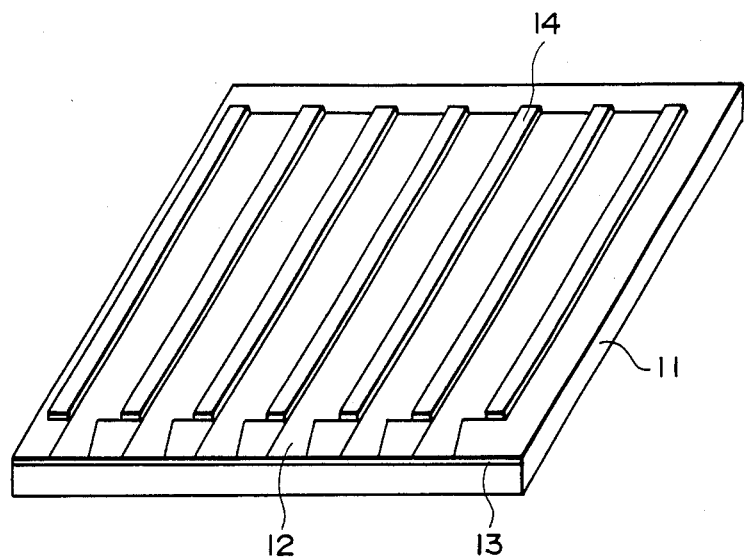
F I G. 2
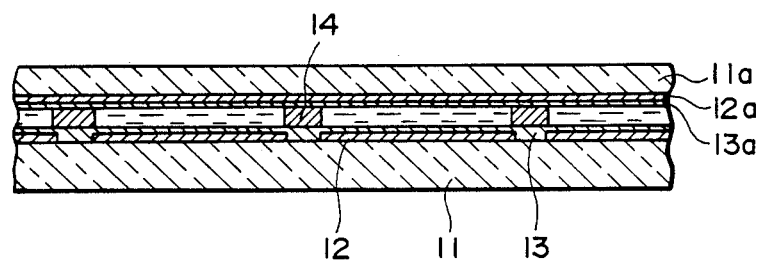
F I G. 3

LIQUID CRYSTAL DEVICE WITH FERROELECTRIC LIQUID CRYSTAL ORIENTED AT NON-PIXEL PORTIONS

FIELD OF THE INVENTION AND RELATES ART

The present invention relates to a ferroelectric liquid crystal device and particularly, to a ferroelectric liquid crystal having an improved contrast in transparency between electrode intersections (pixels) and electrode non-intersections or non-electrode portions (non-pixel portions).

Hitherto, there has been known a liquid crystal device using a TN (twisted nematic) type liquid crystal, as shown in "Voltage-Dependent Optical Activity of a Twisted Nematic Liquid Crystal" by M. Schadt and W. Helfrich, Applied Physics Letters Vol. 18, No. 4 (Feb. 15, 1971), pp. 127-128. However, such a TN-liquid crystal device causes crosstalk when it is constructed to have a high density of pixels or picture elements formed with a matrix electrode structure and driven in a time-division manner, so that the number of pixels has been restricted.

Further, there has been also known a display device of a system wherein pixels are respectively provided with a thin film transistor (TFT) and are thereby switched one by one. This system however involves a problems that it requires a complicated step of forming TFTs on a substrate, so that it is difficult to form a display device of a large area.

In order to obviate the above-mentioned drawbacks of conventional liquid crystal devices, Clark and Lagerwall have proposed the use of a liquid crystal device having bistability (Japanese Laid-Open Patent Application No. 107216/1981, U.S. Pat. No. 4,367,924, etc.). As the bistable liquid crystal, a ferroelectric liquid crystal having chiral smectic C (SmC*) phase or H (SmH*) phase is generally used. The ferroelectric liquid crystal has bistability, i.e, has two stable states comprising a first optically stable state (first orientation state) and a second optically stable state (second orientation state), with respect to an electric field applied thereto. Accordingly, different from the conventional TN-type liquid crystal in the above-mentioned device, the liquid crystal is oriented to the first optically stable state in response to one electric field vector and to the second optically stable state in response to the other electric field vector. Further, this type of liquid crystal very quickly assumes either one of the above-mentioned two stable states in response to an electric field applied thereto and retains such state in the absence of an electric field. By utilizing these properties, essential improvements can be attained with respect to the above-mentioned difficulties involved in the conventional TN-type liquid crystal device.

In a liquid crystal device with a matrix structure having scanning electrodes and signal electrodes, there are portions where opposite electrodes are not present. In the liquid crystal device having a first stable orientation state and as second stable orientation state, either one of the two stable orientation states is assumed in the initial alignment stage of liquid crystal molecules, but the orientation control cannot be effected at portions where opposite electrodes are not present. Accordingly, when the two liquid crystal orientation states are observed through a pair of polarizers arranged in right angle cross nicols, it is impossible to control the selection of the bright or dark state at such portions, so that bright and dark unevenness appears on the entire picture frame when the device is used as a display device, and leakage of light occurs through the portions without opposite electrodes when it is used as an optical shutter array.

SUMMARY OF THE INVENTION

An object of the present invention is to provide a liquid crystal device having removed the above-mentioned defects such as a liquid crystal display device having a good image quality free of unevenness and a high contrast or an optical shutter with appropriate driving characteristic which is free from leakage of light.

According to the present invention, there is provided a liquid crystal device of a matrix cell structure comprising a pair of substrates respectively provided with scanning electrodes and signal electrodes intersecting with each other, and a ferroelectric liquid crystal disposed between the scanning and signal electrodes, each intersection of the scanning and signal electrodes defining a pixel, wherein: a first signal and a second signal are selectively applied to the pixels so that the ferroelectric liquid crystal at each pixel is switched between a first orientation state and a second orientation state, the first signal providing a first electric field for orienting the ferroelectric liquid crystal to the first orientation state, and the second signal providing a second electric field opposite in direction to the first electric field for orienting the ferroelectric liquid crystal to the second orientation state; and the ferroelectric liquid crystal at the portions other than the intersections of the electrodes being oriented to a controlled orientation state. More specifically, the orientation of the liquid crystal at the portions other than the intersections of the electrodes is controlled by providing one base plate with electric charges providing a voltage exceeding the threshold voltage.

When a ferroelectric liquid crystal in a cell is placed in a bistable state including a first and a second stable orientation state, the orientation of liquid crystal molecules at portions other than pixels is governed by the initial orientation. Accordingly, the initial orientation is controlled in the present invention, so that bright-dark unevenness is removed at the portions other than the pixels.

More specifically, in the present invention, a substrate of a liquid crystal cell is irradiated with a corona discharge or an ion flow to be charged so that an electric field exceeding the threshold is applied across a ferroelectric liquid crystal and the ferroelectric liquid crystal is oriented to one of the first and second stable orientation states at the pixels and the portions other than the pixels. Then, in the liquid crystal device according to the present invention, a first signal and a second signal of mutually opposite polarities are selectively applied at the pixels whereby the orientation state of the ferroelectric liquid crystal at the pixels may be changed between the first and second stable orientation states, thus providing a display state with a high contrast.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 1 is a schematic arrangement view of an embodiment of the present invention;

FIG. 2 is a perspective view of a liquid crystal cell substrate;

FIG. 3 is a partial sectional view across the thickness of a liquid crystal cell incorporating the substrate;

DETAILED DESCRIPTION OF THE PREFERRED EMBODIMENTS

First, a structure of a liquid crystal cell as an object of control is explained.

Figure 4:
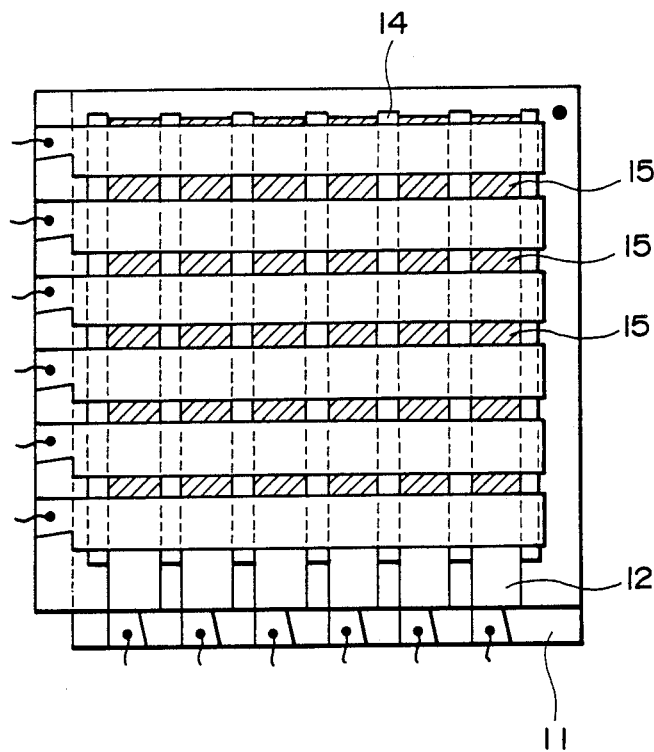
FIG. 4 is a schematic plan view of a matrix liquid crystal cell.

FIG. 2 is a perspective view of a liquid crystal cell substrate, FIG. 3 is a partial sectional view across the thickness of a liquid crystal cell incorporating the substrate, and FIG. 4 is a schematic plan view of the liquid crystal cell. Referring to FIG. 2, on a glass substrate 11 are successively superposed patterned transparent electrodes 12, an insulating film 13 having a function of aligning liquid crystal molecules, and spacers 14 for retaining a prescribed thickness of liquid crystal layer. The laminar state is more clearly shown in FIG. 3. Namely, the transparent electrodes 12 are disposed on the glass substrate 11. The insulating film 13 is applied so as to fill spacings between and to form an overlayer on the electrodes 12. Further, spacers 14 are disposed on the insulating film 13. An opposite substrate 11a is provided with electrodes 12a and an insulating film 13a which may be similar to those described above. A uniaxial alignment treatment such as rubbing is applied to at least one of the substrates. The substrates are then secured to each other and the four peripheral sides thereof are sealed to form a blank cell while leaving an injection port, through which a ferroelectric liquid crystal is injected followed by sealing thereof to form a liquid crystal cell. FIG. 3 shows a sectional view and FIG. 4 shows a schematic perspective view of the liquid crystal cell thus formed.

The injection of the liquid crystal is effected by utilizing atmospheric pressure. More specifically, the blank cell is placed in a vacuum chamber to sufficiently evacuate the space in the cell, and the cell is elevated to a temperature at which the liquid crystal material to be sealed therein assumes an isotropic phase. Then, through an injection port formed in a portion of a substrate without a spacer, a sufficient amount of the liquid crystal material is introduced and the exterior of the cell is returned to the atmospheric pressure. As a result, there occurs a pressure difference of about one atom between the interior and the exterior of the cell, so that the liquid crystal material is pressed by the pressure difference to be injected in a small time. After the entire cell is filled with the liquid crystal, the injection port is sealed with an adhesive to form a liquid crystal cell. Even after the sealing, the cell inner pressure is lower than the atmospheric pressure and the substrates are pressed to each other with spacers therebetween by the atmospheric pressure, so that the liquid crystal layer is held at a thickness corresponding to the thickness or height of the spacers. It was confirmed through an experiment that when a spacer thickness was set to 1.2 $\mu$m and the liquid crystal composition described hereinafter was sealed in a cell as described above, the liquid crystal layer was held at a thickness of 1.2 $\mu$m over the entire cell. A thin glass plate substrate is excellent in contact and may desirably have a thickness of 20–30 $\mu$m, optimally 30–100 $\mu$m.

By the way, in a matrix liquid crystal cell formed as described above, there are present portions not provided with opposite electrodes between pixels. These are portions denoted by a reference numeral 15 as shown in FIG. 4, i.e., portions corresponding to spacings between electrodes on the substrate with no electrodes. On the other hand, on the substrate with spacers, the spacers are disposed between the electrodes so that no liquid crystal layer is formed between the electrodes.

In this example, a two-component liquid crystal composition containing two compounds respectively having the following formula was used:

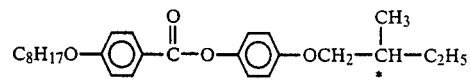

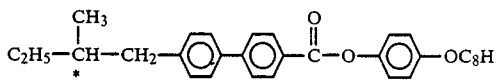

(C* in the formulas denotes an asymmetric carbon atom.)

The above compounds ① and ② were mixed in a ratio of 4:1 and sealed up in the cell. After sealing the liquid crystal, the cell was elevated in temperature to provide an isotropic phase and the gradually cooled at a rate of 0.5° C./hr into a temperature range providing chiral smectic C (SmC*) phase. When this cell was placed between a pair of polarizers arranged in right angle cross nicols, a monodomain was observed to be formed uniformly throughout the cell. It was possible to effect switching between bright and dark states at respective pixels by applying appropriate pulse voltages between the transparent electrodes respectively formed on the upper and lower substrates. At portions with no opposite electrodes, however, it was impossible to control the bright and dark states of the liquid crystal phase which retained initial orientation states providing the bright and dark states in a proportion of nearly 1:1, so that a bright-dark unevenness resulted over the whole picture area. Accordingly, in order to obviate the bight-dark unevenness, it is necessary to control the initial orientation of the above mentioned electrode-free portions. For this purpose, the liquid crystal orientation at these portions is controlled by irradiating a substrate with ion beams or corona charges to apply an electric field to the liquid crystal at the electrode-free portions.

FIG. 1 is a schematic arrangement view of an example of an orientation control apparatus adapted for this purpose. Referring to FIG. 1, a corona discharger 21 having a length equal to or larger than the cell width (extending in the direction of the thickness of the drawings) may be used to effect corona discharge onto a substrate 16 of glass, plastic film, etc., functions as a charge acceptor to provide the substrate 16 with negatively charged carriers. More specifically, in this instance, a DC voltage is applied between the corona discharger 21 and a counter electrode 23 for corona discharge disposed behind the glass substrate to provide the substrate 16 with corona charges. Alternatively, the transparent electrodes 12 disposed on the substrate 11 can also be used as a counter electrode for corona discharge. In this way, an electric field exceeding the threshold of the ferroelectric liquid crystal is generated between the upper and lower substrates by the negative charges and positive charges, so that the orientation of the liquid crystal is uniformized. After the above treatment has been applied to the whole area of the liquid crystal cell by moving the corona discharger 21, it has been confirmed by observation through right angle cross nicols the liquid crystal is uniformly oriented over the entire area of the liquid crystal cell including the electrode-free portions. Also, the pixels can be driven in a prescribed manner to provide images free of bright-dark unevenness.

Alternatively, as a method of providing charges to the substrate 16, a method wherein the substrate 16 is exposed to ions generated by an ion generator as described in, e.g., Japanese Laid-Open Patent Application No. 144721/1985 (U.S. Pat. Appln. Ser. No. 683,862), may also be used.

Now, the operation principle of a ferroelectric liquid crystal cell is supplemented.

Figure 5:
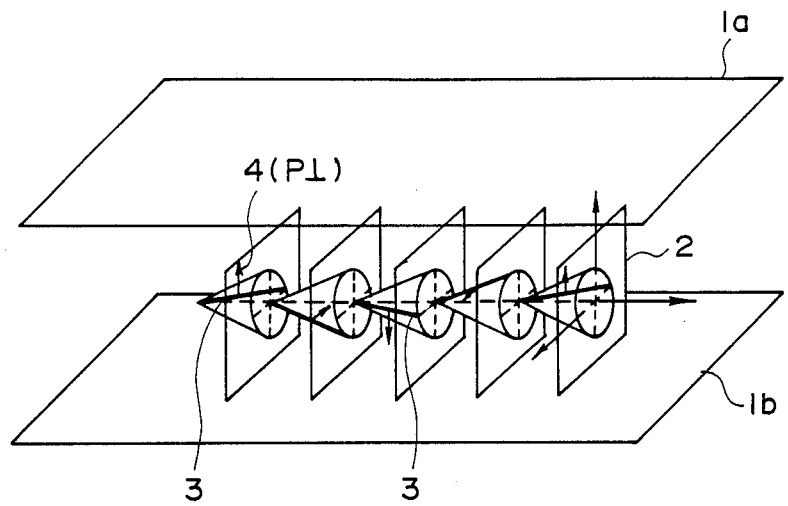
FIGS. 5 and 6 are respectively a schematic perspective view of a liquid crystal cell for illustrating the operation principle of a ferroelectric liquid crystal.
Figure 6:
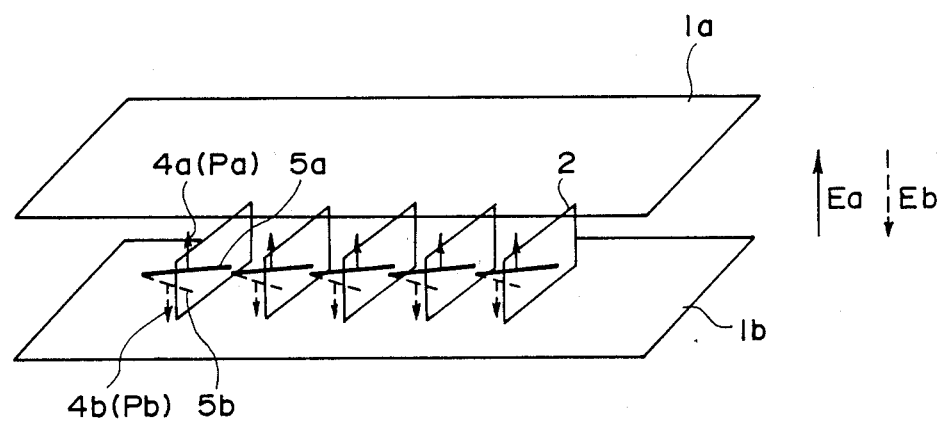

Referring to FIG. 5, there is schematically shown an example of a ferroelectric liquid crystal cell for explanation of the operation thereof. Reference numerals 1a and 1b denote substrates (glass plates) on which a transparent electrode of, e.g., $In_2O_3$, $SnO_2$, ITO (Indium-Tin-Oxide), etc., is disposed respectively. A liquid crystal of a chiral smectic phase such as SmC* or SmH* in which liquid crystal molecular layers 2 are aligned perpendicular to surfaces of the glass plates is hermetically disposed therebetween. A full line 3 shows liquid crystal molecules. Each liquid crystal molecule 3 has a dipole moment (P⊥) 4 in a direction perpendicular to the axis thereof. When a voltage higher than a certain threshold level is applied between electrodes formed on the base plates 1a and 1b, a helical structure of the liquid crystal molecule 3 is unwound or released to change the alignment direction of respective liquid crystal molecules 3 so that the dipole moments (P⊥) 4 are all directed in the direction of the electric field. The liquid crystal molecules 3 have an elongated shape and show refractive anisotropy between the long axis and the short axis thereof. Accordingly, it is easily understood that when, for instance, polarizers arranged in cross nicol relationship, i.e., with their polarizing directions crossing each other, are disposed on the upper and the lower surface of the glass plates, the liquid crystal cell thus arranged functions as a liquid crystal optical modulation device of which optical characteristics vary depending upon the polarity of an applied voltage. Further, when the thickness of the liquid crystal cell has a sufficiently thin thickness (e.g., less than 10 $\mu$), the helical structure of the liquid crystal molecules is unwound or released to provide a non-helical structure even in the absence of an electric field whereby the dipole moment assumes wither of the two states, i.e., Pa in an upper direction 4a or Pb in a lower direction 4b as shown in FIG. 6. When electric field Ea or Eb higher than a certain threshold level and different from each other in polarity as shown in FIG. 6 is applied to cell having the above-mentioned characteristics, the dipole moment is directed either in the upper direction 4a or in the lower direction 4b depending on the ventor of the electric field Ea or Eb. In correspondence with this, the liquid crystal molecules are oriented to either a first stable state 3a or a second stable state 3b.

Advantages accompanying the use of such a ferroelectric liquid crystal device as an optical modulation device are that the response speed is quite fast and that the orientation of the liquid crystal shows bistability. More specifically, with reference to FIG. 6, when the electric field Ea is applied to the liquid crystal molecules, they are oriented to the first stable state 3a. This state is stably retained even if the electric field is removed. On the other hand, when the electric field Eb of which direction is opposite to that of the electric field Ea is applied thereto, the liquid crystal molecules are oriented to the second stable state 3b, whereby the directions of molecules are changed. This state is similarly retained stably even if the electric field is removed. Further, as long as the magnitude of the electric field Ea or Eb being applied is not above a certain threshold value, the liquid crystal molecules are placed in the respective orientation states. In order to effectively realize high response speed and bistability, it is preferable that the thickness of the cell is as thin as possible.

As described hereinafter, according to the present invention, it becomes possible to control the orientation of a ferroelectric liquid crystal at the portions with no electrodes in a ferroelectric liquid crystal cell to provide a liquid crystal device of excellent performances, which may be used as a liquid crystal display device of a high quality free of bright-dark unnevenness or an optical shutter with a good driving characteristic free of light leakage.

What is claimed is:

1. In a liquid crystal device of a matrix cell structure comprising a pair of substrates respectively provided with scanning electrodes and signal electrodes intersetting with each other, and a ferroelectric liquid crystal disposed between the scanning and signal electrodes formed in a layer thin enough to release its own helical structure thereby to provide at least two stable orientation states in the absence of an electric field including a first orientation state and a second orientation state, each intersection of the scanning and signal electrodes defining a pixel, the improvement wherein:

a first signal and a second signal are selectively applied to the pixels so that the ferroelectric liquid crystal at each pixel is switch between the first orientation state and the second orientation state, the first signal providing a first electric field for orienting the ferroelectric liquid crystal to the first orientation state, and the second signal providing a second electric field opposite in direction to the first electric field for orienting the ferroelectric liquid crystal to the second orientation state; and the ferroelectric liquid crystal at the portion other than the intersections of the electrodes is oriented to only one of said at least two stable orientation states in the absence of an electric field.

2. In a liquid crystal device of a matrix cell structure comprising a pair of substrates respectively provided with scanning electrodes and signal electrodes intersecting with each other, and a ferroelectric liquid crystal disposed between the scanning and signal electrodes formed in a layer thin enough to release its own helical structure thereby to provide at least two stable orientation states in the absence of an electric field including a first orientation state and a second orientation state, each intersection of the scanning and signal electrodes defining a pixel, the improvement wherein:

a first signal and a second signal are selectively applied to the pixels so that the ferroelectric liquid crystal at each pixel is switched between the first orientation state and the second orientation state, the first signal providing a first electric field for orienting the ferroelectric liquid crystal to the first orientation state, and the second signal providing a second electric field opposite in direction to the first electric field for orienting the ferroelectric liquid crystal to the second orientation state;

the orientation of the ferroelectric liquid crystal at the portions other than the intersections is oriented to only one of said at least two stable orientation states by electric charges provided to at least one of the substrates.

3. A liquid crystal device according to claim 1 or 2, wherein said ferroelectric liquid crystal is a chiral smectic liquid crystal.

4. A liquid crystal device according to claim 3, wherein said chiral smectic liquid crystal is a chiral smectic C or H liquid crystal.

5. A liquid crystal device according to claim 1 or 2 wherein said first and second signals are opposite in polarity.

6. A liquid crystal device according to claim 2, wherein said electric charges have been provided by corona discharge.

7. A liquid crystal device according to claim 2, wherein said electric charges have been provided by ion irradiation.

* * * * *

UNITED STATES PATENT AND TRADEMARK OFFICE
CERTIFICATE OF CORRECTION

PATENT NO. : 4,846,560
DATED : July 11, 1989
INVENTOR(S) : AKIRA TSUBOYAMA ET AL.

It is certified that error appears in the above-identified patent and that said Letters Patent is hereby corrected as shown below:

COLUMN 3

Line 55, "atom" should read --atm.--.

COLUMN 6

Line 30, "interset-" should read --intersect- --.
    Line 41, "switch" should read --switched--.
    Line 49, "portion" should read --positions--.

COLUMN 7

Line 6, "the orientation" should read
        --and wherein the orientation--.

Signed and Sealed this

Seventeenth Day of July, 1990

Attest:

HARRY F. MANBECK, JR.

*Attesting Officer*        *Commissioner of Patents and Trademarks*